(12) United States Patent
Ward

(10) Patent No.: US 12,471,600 B2
(45) Date of Patent: Nov. 18, 2025

(54) WEED SEED GERMINATION INHIBITOR

(71) Applicant: Beta Biofuel Solutions, LLC, Ringoes, NJ (US)

(72) Inventor: Paula Marie L. Ward, Ringoes, NJ (US)

(73) Assignee: BETA BIOFUEL SOLUTIONS, LLC, Ringoes, NJ (US)

( * ) Notice: Subject to any disclaimer, the term of this patent is extended or adjusted under 35 U.S.C. 154(b) by 0 days.

(21) Appl. No.: 18/696,209

(22) PCT Filed: Sep. 27, 2022

(86) PCT No.: PCT/US2022/077115
§ 371 (c)(1),
(2) Date: Mar. 27, 2024

(87) PCT Pub. No.: WO2023/049938
PCT Pub. Date: Mar. 30, 2023

(65) Prior Publication Data
US 2024/0334939 A1    Oct. 10, 2024

Related U.S. Application Data

(60) Provisional application No. 63/248,774, filed on Sep. 27, 2021.

(51) Int. Cl.
| | |
|---|---|
| *A01N 65/00* | (2009.01) |
| *A01N 31/08* | (2006.01) |
| *A01N 31/16* | (2006.01) |
| *A01N 37/10* | (2006.01) |
| *A01N 37/40* | (2006.01) |
| *A01N 43/16* | (2006.01) |
| *A01N 61/00* | (2006.01) |
| *A01N 63/30* | (2020.01) |
| *A01P 13/00* | (2006.01) |

(52) U.S. Cl.
CPC ............. *A01N 65/00* (2013.01); *A01N 31/08* (2013.01); *A01N 31/16* (2013.01); *A01N 37/10* (2013.01); *A01N 37/40* (2013.01); *A01N 43/16* (2013.01); *A01N 61/00* (2013.01); *A01N 63/30* (2020.01); *A01P 13/00* (2021.08)

(58) Field of Classification Search
CPC ........ A01N 63/30; A01N 63/50; A01N 61/00; A01N 65/00; A01N 25/32
See application file for complete search history.

(56) References Cited

U.S. PATENT DOCUMENTS

| 3,567,425 A | 3/1971 | Olin et al. | |
| 10,329,207 B2* | 6/2019 | Ward | C05F 11/00 |
| 12,207,661 B2* | 1/2025 | Granato Villas Boas | A21D 8/04 |
| 2007/0270620 A1* | 11/2007 | Borthakur | C07C 45/78 568/438 |
| 2010/0256353 A1* | 10/2010 | West | C12P 7/10 536/123 |
| 2012/0238638 A1* | 9/2012 | Virtanen | A01N 65/00 562/478 |
| 2016/0318821 A1* | 11/2016 | Ward | C05F 11/08 |
| 2019/0112254 A1* | 4/2019 | Minamino | C07C 45/79 |

FOREIGN PATENT DOCUMENTS

| CA | 2968950 A1 | 6/2015 |
| CN | 101974507 A | 2/2011 |
| CN | 104447059 A | 3/2015 |
| CN | 104761309 A | 7/2015 |
| CN | 105767491 A * | 7/2016 |
| CN | 113003736 A | 6/2021 |
| JP | H05339117 A | 12/1993 |
| JP | 2020048519 A | 4/2020 |
| WO | 2002/065836 A2 | 8/2002 |
| WO | 2015/095722 A1 | 6/2015 |

OTHER PUBLICATIONS

Machine translation of CN 105767491 (Jul. 20, 2016).*
Higuchi, T., "Microgial degradation of lignin: role of lignin peroxidase, manganese peroxidase, and laccase," Proceedings of the Japan Academy, Series B Physical and Biological Sciences, vol. 80(5), pp. 204-214 (2004).*
Choi, B. et al., "Spent coffee as a rich source of antioxidative compounds," Food Science and Biotechnology, vol. 26, pp. 921-927 (2017).*
Ertani, A. et al., "Biological activity of vegetal extracts containing phenols on plant metabolism," Molecules, vol. 2, pp. 1-14 (2016).*
Taniguchi, M. et al., "Evaluation of pretreatment with Pleurotus ostreatus for enzymatic hydrolysis of rice straw," Journal of Bioscience and Bioengineering, vol. 100(6), pp. 637-643 (2005).*
Office Action dated Jun. 26, 2024 issued in Canadian Patent Application No. 3,233,122 (5 pages).
Elsakhawy et al: "Efficacy of Mushroom Metabolites (*Pleurotus ostreatus*) as a Natural Product for the Suppression of Broomrape Growth (Orobanche crenata Forsk) in Faba Bean Plants", Plants, 2020, vol. 9, Article 1265, pp. 1-18, doi: 10.3390/plants9101265.

(Continued)

*Primary Examiner* — John Pak
(74) *Attorney, Agent, or Firm* — FOX ROTHSCHILD LLP

(57) ABSTRACT

Compositions for treating soil to inhibit weed seed germination, containing (a) a phytotoxic component containing phytotoxic polyphenols: and (b) a probiotic component containing organic matter and spawn of a polyphenol-degrading fungal species or other species producing polyphenol-degrading enzymes, wherein the phytotoxic component ranges from about 50% to about 99.99% in the total weight of the phytotoxic component and the probiotic component and the probiotic component ranges from about 0.01% to about 35% in the total weight of the phytotoxic component and the probiotic component: and (c) a particulate diluent material. Methods of using the compositions for inhibiting weed seed germination are also disclosed.

13 Claims, No Drawings

(56) References Cited

OTHER PUBLICATIONS

Hasan et al: "Bioherbicides: An Eco-Friendly Tool for Sustainable Weed Management", Plants 2021, 10, 1212, pp. 1-21, https://doi.org/10.3390/plants10061212.

Schwartz et al: "Molecular recognition of wood polyphenols by phase II detoxification enzymes of the white rot Trametes versicolor", Scientific Reports, 2018, 8:8472, pp. 1-11, DOI/10.1038/s41598-018-26601-3.

Tubeileh et al: "Exploiting Olive Mill Byproducts and Other Waste for Organic Weed Management", Horticulturae, 2019, vol. 5 Article 59, pp. 1-13, doi: 10.3390/horticulturae5030059.

Examination Report No. 1 dated May 31, 2024 issued in Australian Patent Application No. 2022349104 (5 pages).

Harding, et al: "Controlling weeds with fungi, bacteria and viruses: a review", Frontiers in Plant Science, Aug. 2015, vol. 6, Art. 659, pp. 1-13.

Ibanez, et al: "Phytotoxicity of Essential Oils on Selected Weeds: Potential Hazard on Food Crops", Plants, 2018, 7, 79; pp. 1-15, doi:10.3390/plants7040079.

Toro-Uribe, et al: "Insight of Polyphenol Oxidase Enzyme Inhibition and Total Polyphenol Recovery from Cocoa Beans", Antioxidants 2020, 9, 458; pp. 1-13, doi:10.3390/antiox9060458.

Cha et al: "Fungal Laccase-Catalyzed Oxidation of Naturally Occurring Phenols for Enhanced Germination and Salt Tolerance of *Arabidopsis thaliana*: A Green Route for Synthesizing Humic-like Fertilizer", J. Agric. Food Chem. 2017, 65, pp. 1167-1177, DOI: 10.1021/acs.jafc.6b04700.

Guo, Fen: "Deep Processing of Coffee", Yunnan University Press, Kunming, Mar. 2014, ISBN 978-7-5482-1931-6.

Li, Jiefen: "Plant Physiology", Northeast Normal University Press, Jilin, Aug. 1987, ISBN 7-5602-0039-7/Q.3.

Phan, et al: "Potential uses of spent mushroom substrate and its associated lignocellulosic enzymes", Applied Microbiology and Biotechnology, 2012, vol. 96, pp. 863-873.

Examination Report No. 2 dated May 7, 2025 issued in Australian Patent Application No. 2022349104 (4 pages).

\* cited by examiner

WEED SEED GERMINATION INHIBITOR

CROSS-REFERENCE TO RELATED APPLICATIONS

This application is the U.S. National Phase of International Patent Application Serial No. PCT/US22/77115, filed Sep. 27, 2022, which claims a priority benefit under 35 U.S.C. § 119 (e) to U.S. Provisional Patent Application Ser. No. 63/248,774 filed Sep. 27, 2021. The contents of the applications are incorporated herein by reference in their entirety.

FIELD OF THE INVENTION

The patent document relates to the field of safe and effective weed seed germination inhibitors, especially to compositions comprising natural phytotoxic and probiotic materials which are capable of providing sustained nutrition as well as controlling weed growth.

BACKGROUND OF THE INVENTION

Weed infestation often leads to lower crop yields in agriculture, less efficient land use, and poor crop quality. In agronomic crops, specific problems caused by weedy plants constitute several billion dollars of annual yield loss in the United States alone. As an example, the green industry, including private and commercial landscape projects such as golf courses, parks, and athletic fields has experienced significant expansion over the last decade. In turfgrass settings, the traditional definition of a weed is often expanded to any plant that is unwanted because of its disruptive effect on the aesthetic appearance, stabilizing capacity, or overall utility of a turf. Uniformity is one of the key components of turfgrass quality. A different leaf width and/or shape, growth habit, or color will substantially disrupt the uniformity of a turf. In addition to detracting from aesthetic appearance and uniformity, weeds also compete with desirable turfgrass species for light, soil moisture and nutrients, and carbon dioxide.

Weed management is generally limited to those methods involving prevention of propagule dispersal and those limiting infestation including mechanical and chemical controls. Sanitary practices resulting in prevention of infestation include the use of weed free sod, soil and sand, equipment cleaning to remove propagules and mowing of weed-infested adjacent fields to prevent weed seed dispersal. Weed encroachment is minimized when appropriate management practices are used. In turfgrass settings, utilization of the proper turf species, mowing height and frequency, soil fertility and pH level, irrigation frequency and intensity, disease, insect and nematode controls, and aeration of compacted areas can result in a dense and vigorous turf.

Mechanical weed control, including removal of weeds either by hand or by spading, is a labor-intensive control method, even though it can effectively be used for broadleaf weeds on relatively small areas. Organic products such as acetic acid or clove oil-based products will result in significant crop injury. Corn gluten meal can provide some initial pre-emergent weed suppression but many studies have shown inconsistent control.

A need remains for a biological weed seed germination inhibitor that effectively controls weed, brings readily available nutrition for plant uptake, reduces and even eliminates the application of pesticides, herbicides and other chemicals, and encourages the favorable re-characterization of soil condition overall as a soil mediator.

SUMMARY OF THE INVENTION

Various embodiments provide compositions with a multifold of advantages for treating soil. Potential advantages include effective weed control, enriched nutrition for plant uptake from low cost recycled or waste material, increased plant production, and decreased chemical and biological pollution and pest burden.

An aspect of the patent document discloses a composition for inhibiting weed seed germination. The composition includes:
(a) a phytotoxic organic matter component containing phytotoxic polyphenols:
(b) a probiotic component containing spawn of a polyphenol-degrading fungal species or other species producing polyphenol degrading enzymes: wherein the phytotoxic organic matter component ranges from about 65% to about 99.99% of the total weight of the phytotoxic organic matter component and the probiotic component, and wherein the probiotic component ranges from about 0.01% to about 35% in the total weight of the phytotoxic organic matter component and the probiotic component: and
(c) optionally, a particulate diluent material.

The components of the composition, both compatible with the ecosystem, work together to release and break down phytotoxic polyphenols that then inhibit weed seed germination, and do so at a faster rate than when polyphenol-containing organic materials naturally degrade to release and break down polyphenols in typical soil environments. The phytotoxic organic matter component is derived from plant or human food products and gives clear beds a head start. It reduces annual weeds organically and suppresses most C3 and C4 annual weed seed germination.

In some embodiments, the phytotoxic organic matter polyphenol component is derived from one or more plant sources. The phytotoxic polyphenol component may be present in various sections of a plant such as root, bark, leaf, stem, seed, fruit, and branch. Non-limiting examples of polyphenol source include grapes, tea, cocoa, olives, nuts, apples, citrus (citron, lemon, lime, orange, bergamot, and grapefruit), rosemary, berries and soybean. The active polyphenol content of these materials can vary by type, with contents varying, for example, from 15 000 mg per 100 g in cloves to 10 mg per 100 ml in rose' wine.

In some embodiments, the phytotoxic organic matter component is derived from one or more used, waste or recycled plant sources.

By combining the phytotoxic organic matter polyphenol component with the probiotic component, the activity of the organisms in the probiotic component can cleave the chemical bonds in the polyphenol source and release the desired phytotoxins in a reasonably predictable pattern. According to one embodiment, the probiotic component produces separate enzymes that degrade lignins and polyphenols, respectively. Degrading lignin-rich materials in the phytotoxic polyphenol component in situ provides nutritious compounds available for plant uptake. In some embodiments, the probiotic component contains spawn of a fungal species that produces the enzyme laccase, which degrades polyphenols. In some embodiments, the laccase-producing fungal species in the probiotic component also produces lignin-degrading enzymes such as lignin peroxidase.

In some embodiments, a commercially available product containing spawn of a laccase-producing fungal species may be used as the probiotic component, such as PROTERRAR, which can be sourced from High Ground of East Amwell, NJ.

In some embodiments, the spawn comprises a white rot fungal species.

In another embodiment, a kit is provided containing the probiotic component, the particulate diluent material and instructions for mixing the two with organic matter containing phytotoxic polyphenols. This embodiment is essentially a concentrated masterbatch of fungal spawn (or other species producing a polyphenol lignin degrading enzyme) formulated for addition to a source of lignin-rich organic matter containing phytotoxic polyphenols available as a waste material at the site of application, such as a vineyard, orchard, olive grove, and the like. In some embodiments, the probiotic component contains spawn of a laccase-producing fungal species.

In some embodiments, spawn-containing probiotic components according to the present invention are desiccated to provide a product having a water content of less than about 5 wt %, in which the spawn are in a non-vegetative state. In some embodiments, however, the spawn is in a vegetative state. In at least one embodiment there is provided a method of treating soil by applying effective amounts of the present composition to the soil.

DETAILED DESCRIPTION

Various embodiments of the composition of this patent document combine a probiotic composition containing spawn of a polyphenol-degrading fungal species, with organic matter containing phytotoxic polyphenols for inhibiting weed seed germination. Digestion of the organic matter containing phytotoxic polyphenols by the polyphenol-degrading fungal species releases and degrades the phytotoxic polyphenols at a rate faster and concentration larger than such materials are ordinarily released and degraded by natural decay processes, thereby inhibiting weed seed germination.

While the following text may reference or exemplify specific microorganisms and phytotoxic polyphenol-containing materials, it is not intended to limit the scope of the invention to such particular reference or examples. For example, other polyphenol degrading enzyme producing species may be substituted for fungal spawn. The microorganisms and fungal spawn may be replaced in whole or in part by an isolated laccase enzyme. The resulting products will achieve the same objective by digesting organic matter containing phytotoxic polyphenols to release and degrade the phytotoxic polyphenols and inhibit weed seed germination.

Various modifications may be made by those skilled in the art, in view of practical and economic considerations, such as the source of the microorganisms and the characteristics of the phytotoxic polyphenol-containing organic material. In order to more clearly and concisely describe the subject matter of the claims, the following definitions are intended to provide guidance as to the meaning of terms used herein.

Definitions

The articles "a" and "an" as used herein mean "one or more" or "at least one," unless otherwise indicated. That is, reference to any element of the present invention by the indefinite article "a" or "an" does not exclude the possibility that more than one of the element is present.

"About" means the referenced numeric indication plus or minus 10% of that referenced numeric indication.

"Degradation" or "degrade" as used herein refers to the breakdown of lignocellulose-containing material with the aid of microorganisms such as a white rot fungal and other microorganism species.

"Probiotic additive" as used herein refers to a single species of fungal spawn or a combination of species. The probiotic additive may include white fungal species.

A "waste" plant source is defined as organic matter or biomass that would otherwise be composted, sent to a landfill or destined for another means of waste disposal.

Unless otherwise specified, all percentages are percentages by weight.

"Polyphenol" or "polyphenols" as used herein refers to naturally existing chemical compounds having multiple phenol structural units, present as a natural product that occur in tissues of all higher plants. The number and characteristics of the phenol structures underline the unique physical, chemical, and biological (e.g., metabolic, toxic, and therapeutic) properties of particular members of the class. The compositions of the present invention use organic matter containing phytotoxic polyphenols. Non-limiting examples of plants that contain phytotoxic polyphenols include olive, grape, cocoa, etc.

Composition For Inhibiting Weed Seed Germination

An aspect of the patent document provides a composition for inhibiting weed seed germination. The composition includes (a) an organic matter containing phytotoxic polyphenols; (b) a probiotic component containing spawn of a polyphenol-degrading fungal species or other species producing polyphenol degrading enzymes, wherein the phytotoxic organic matter component ranges from about 65% to about 99.99%, from about 75% to about 99%, from about 80% to about 98% in the total weight of the phytotoxic organic matter component and the probiotic component, and wherein the probiotic component ranges from about 0.01% to about 35% in the total weight of the phytotoxic organic matter component and the probiotic component: and optionally (c) a particulate diluent material. The composition effectively inhibits weed seed germination.

The phytotoxic organic matter component provides the source of polyphenols for seed germination inhibition, while the amount of the probiotic component controls the rate and duration of the inhibition effect. In some embodiments, the amount of the probiotic component ranges from about 0.01% to about 35%, from about 0.01% to about 25%, from about 0.01% to about 20%, from about 0.01% to about 15%, from about 0.05% to about 10%, from about 0.1% to about 10%, from about 0.01% to about 5%, from about 0.1% to about 3%, from about 0).1% to about 2.5%, from about 0).1% to about 2%, from about 0).1% to about 1%, from about 0.2% to about 1%, from about 0.2% to about 0.8%, from about 0.3% to about 0.7%, or from about 0.4% to about 0.6% by weight in the total weight of the phytotoxic organic matter component and the probiotic component in the composition.

The amount of the three components in the composition can be adjusted depending on relevant factors such as the target soil location, the source of the individual components, the desired duration of effectiveness, and the concentrations of the active ingredient in each component. Higher concentrations of the phytotoxic organic matter component, up to 99%, help to extend the duration of the effectiveness of the soil application. The amount of probiotic component relative to the phytotoxic component determines how rapidly the polyphenol component is depleted, after which the soil can be deliberately seeded.

Once percentage weights for the phytotoxic component and the probiotic component are determined, the remaining percentage for the particulate diluent material can be readily calculated. The combination of polyphenol containing organic matter with the probiotic is further combined with a biomass diluent to promote even dispersion of the active product.

One or more components or the whole composition can be in a dry form with extended shelf-life, wherein the spawn is fully integrated on a lignocellulosic substrate, both of which are desiccated so that the spawn is in a non-vegetative state and the composition has a water content less than about 5 wt %. Alternatively, spawn in a vegetative state can be used. Vegetative state probiotic organisms are added by dry weight calculation.

The particulate diluent material is a biomass, which can be an organic material, or a soil material, or soil-like material. A soil-like material is defined as being mixed from separate components instead of being directly sourced from the ground. In some embodiments, the particle size of the soil or soil-like material can range from a #10 screen to ¼". In some embodiments, the diluent includes chips or pelleted or hammer-milled paper. One or more plant-based materials can also be included in the diluent.

The composition containing the phytotoxic organic matter component can be blended into bed substrates or chemical free mulches to become a time-release weed prevention system. Because the phytotoxic component is derived from natural materials or products, it promotes the growth of desirable plant matter. Potted or rooted plant matter is not affected, and herbicide use can be significantly reduced or eliminated.

The phytotoxic organic matter component contains polyphenols and is derived from a plant source. Non-limiting examples of plant sources include algae, cocoa, olive, nut, green tea, black tea, coffee and other fruit and vegetables. Examples of polyphenol-containing fruits and vegetables include blackberry, raspberry, black currant, strawberry, blueberry, kiwi, cherry, plum, aubergine, pear, chicory, artichoke, potato, corn, wheat, rice, oat, cider, plum, red cabbage, onion, curly kale, leek, cherry tomato, broccoli, apricot, beans, tomato, parsley, celery, capsicum pepper, orange, lemon, peach, moringa, and plum. Two or more of the above polyphenol sources can be used in combination in any manner.

The polyphenols may be present in root, bark, leaves, or fruit. The plant source can be in any form as long as it contains the suitable amount of polyphenols. In some embodiments, the plant source is waste or used food product such as tea or coffee residue and olive oil pomace. Polyphenols can be used in various structures or forms. They may also bear substituents including for example, carboxylic acid, alkyl, halogen, ester, amide, and any combination thereof. Non-limiting examples of polyphenols include gallic acid, catechin, epicatechin, p-coumaric acid, ferulic acid, phloridzin, arbutin, chlorogenic acid and rutin.

The amount of polyphenols in the phytotoxic component may vary depending on the specific plant source. In some embodiments the polyphenols range from about 0.5% to about 50%, from about 0).5% to about 30%, from about 0).5% to about 20%, from about 0).5% to about 10%, from about 0).5% to about 5%, from about 1% to about 20%, from about 1% to about 10%, or from about 2% to about 5%, of the total weight of the organic matter containing phytotoxic polyphenols. "Phytotoxic organic matter component" is defined as the vegetative material comprising the polyphenols. Thus the quantity by weight of polyphenol will be less than the quantity of phytotoxic material and the difference will depend upon the concentration of polyphenols in the phytotoxic organic matter.

In certain embodiments, the polyphenol-degrading fungal species of the probiotic component is a laccase-producing basidiomycete, such as basidio. Probiotic components are also provided in which the fungal species also produces lignin-degrading peroxidases. Isolated laccases can supplement or be substituted for the fungal spawn and other species and are considered to be included within the definition of a "probiotic component." Isolated peroxi-dases can also be used in the compositions of the present invention.

The composition can be provided in various forms. Non-limiting examples include powders, granules, suspensions, dispersion, fibrous matter, aqueous dilutions, mixtures and combinations thereof.

According to one embodiment, kits are provided containing the probiotic component, the particulate diluent material and instructions for mixing the two with organic matter containing phytotoxic polyphenols. This embodiment is essentially a concentrated masterbatch of fungal spawn or other laccase-producing species formulated for addition to a source of organic matter containing phytotoxic polyphenols, preferably available as a waste material at the site of application, such as a vineyard, orchard, olive grove, and the like. Kits according to the present invention provide between 9 and 99 kg of particulate diluent material for every kg of the probiotic component.

Method of Treating Soil

In another embodiment there is provided a method for inhibiting weed seed germination using the above-described compositions. Methods according to the present invention typically apply to the soil between about 0.5 and about 10 tons per acre of the inventive compositions. In one embodiment, between about 0.5 and about 5 tons per acre of the inventive compositions are applied to the soil. In one embodiment, about one ton per acre of the inventive compositions are applied to the soil. In another embodiment, between about 1 and about 3 tons per acre of the inventive compositions are applied to the soil. In yet another embodiment, between about 2 and about 3 tons per acre of the inventive compositions are applied to the soil. The composition should be blended well into the top ½ inch to six inches of soil, or top-dressed about two to four inches into the soil, to ensure reasonable coverage of environmentally deposited seed matter, after which the soil is then watered deeply to extend the effectiveness to the site.

In another embodiment, the composition can be fully integrated into carrier as a mulch or planting soil for rooted plants. In one aspect of this embodiment, the composition can be used without further soil admixture as a planting soil for plant plugs, rooted or potted plants, which can be used, for example, in landscaping or field agriculture. Or it can be applied to the soil immediately before or after the plat plugs, rooted or potted plants are planted.

The timing and frequency can be adjusted depending on the specific components of the composition, i.e., the concentration of the phytotoxic component, and the target field of application. In some embodiments, the composition is applied more than about 1 month, more than about 2 months, more than about 3 months before seeding in the soil. In some embodiments, the composition of the present invention is applied at a rate of about 1, 1.5 or 2 ton per acre 1 month or two months preceding the act of deliberately seeding the site. The amount of time between application of the composition of the invention and deliberate seeding should be selected so that germination of deliberately planted seeds is not inhibited.

The means and amount of the composition to be applied to the soil depends on factors including the soil precondition and can be determined by one of ordinary skill in the art without undue experiments. In non-limiting embodiments for illustration of "applying the composition", the composition can be spread or sprayed as a surface dress, mixed with the soil, or combined with other substances before being put in contact to the soil.

The foregoing merely illustrates the principles of the disclosure and is not intended to be limiting, and merely sets forth some of the many possible embodiments for the appended claims. Those skilled in the art will readily recognize various modifications and changes that may be made without following the embodiments described herein, and without departing from the spirit and scope of the following claims.

What is claimed is:

1. A method of inhibiting weed seed germination comprising applying to soil in need of inhibition of weed seed germination a composition for inhibiting weed seed germination in an amount effective to inhibit weed seed germination, wherein said composition comprises:
   (a) 65 to 99.9 wt % of an organic matter component selected from the group consisting of roots, bark, leaf, seeds, fruit, branches, stems, and combination thereof, of nuts, fruits, berries, rosemary, aubergine, chicory, corn, wheat, rice, oat, olive, red cabbage, curly kale, leek, cherry tomato, broccoli, parsley, celery, soybeans, moringa, artichoke, potato, olive, onion, beans, tomato, black tea, green tea, *capsicum* pepper, cocoa, turmeric, or 65 to 99.9 wt % of an organic matter component selected from the group consisting of root, bark, leaf, branch, stem, and combination thereof, of coffee, wherein the organic matter component contains 0.1 wt % to 15 wt % polyphenols, based on the weight of the organic matter component;
   (b) 0.1 to 35 wt % of a probiotic component comprising spawn of a polyphenol-degrading fungal species; and
   (c) optionally, a particulate diluent material;
wherein (1) the composition releases and breaks down phytotoxic polyphenols and optionally one or more of gallic acid, coumaric acid, and ferulic acid, in an amount effective to inhibit weed seed germination, including C3 or C4 annual weed seed germination, (2) the fungal species in the composition produces laccase enzyme, and (3) the composition is not integrated or blended into a carrier as a mulch.

2. The method of claim 1, wherein the fruit is selected from the group consisting of citrus, cherry, plum, apple, pear, grape, apricot and peach.

3. The method of claim 1, wherein the berries are selected from the group consisting of blackberries, raspberries, black currant, strawberries, blueberries, and kiwi.

4. The method of claim 1, wherein the nuts, fruits, berries, rosemary, aubergine, chicory, corn, wheat, rice, oat, olive, red cabbage, curly kale, leek, cherry tomato, broccoli, parsley, celery, soybeans, moringa, artichoke, potato, olive, onion, beans, tomato, black tea, green tea, *capsicum* pepper, cocoa, turmeric, and coffee are used or waste plant material.

5. The method of claim 1, wherein the fungal species is a white rot fungal species.

6. The method of claim 1, wherein the probiotic component consists essentially of spawn that is fully integrated on a lignocellulosic substrate, both of which are desiccated so that said spawn is in a non-vegetative state and said composition has a water content less than 5 wt %.

7. The method of claim 1, wherein the probiotic component ranges from about 2.5 to about 25 wt % in the composition.

8. The method of claim 1, wherein the polyphenol-degrading fungal species in the probiotic component also produces a lignin peroxidase.

9. The method of claim 1, wherein the composition is in a form selected from the group consisting of a powder, granule, suspension, dispersion, fibrous matter, mixture, and combinations thereof.

10. The method of claim 1, comprising applying between about 0.5 to about 10.0 tons of the composition per acre of soil.

11. The method of claim 1, comprising applying the composition more than 2 months before deliberately seeding the soil.

12. The method of claim 1, comprising applying the composition to the soil before planting rooted plants.

13. The method of claim 1, further comprising diluting the composition with water and then applying the diluted composition to the soil.

* * * * *